United States Patent
Iwashita et al.

(10) Patent No.: US 6,806,674 B2
(45) Date of Patent: Oct. 19, 2004

(54) CONTROL DEVICE FOR DRIVING AND CONTROLLING A SERVOMOTOR

(75) Inventors: Yasusuke Iwashita, Yamanashi (JP); Tadashi Okita, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 10/158,143

(22) Filed: May 31, 2002

(65) Prior Publication Data

US 2002/0195983 A1 Dec. 26, 2002

(30) Foreign Application Priority Data

Jun. 6, 2001 (JP) ......................................... 2001-171122
Apr. 12, 2002 (JP) ......................................... 2002-111159

(51) Int. Cl.⁷ ........................ G05B 19/10; G05B 19/18; G05B 19/25; G05B 11/18
(52) U.S. Cl. ........................ 318/567; 318/569; 318/573; 318/600; 318/592
(58) Field of Search ................................. 318/567, 569, 318/573, 600, 592, 568.17, 590, 594, 625, 560

(56) References Cited

U.S. PATENT DOCUMENTS

| | | | | |
|---|---|---|---|---|
| 5,148,637 A | * | 9/1992 | Byron | 451/5 |
| 5,285,378 A | * | 2/1994 | Matsumoto | 700/37 |
| 5,552,688 A | * | 9/1996 | Haga | 318/569 |
| 5,656,906 A | * | 8/1997 | Iwashita et al. | 318/568.23 |
| 5,736,824 A | * | 4/1998 | Sato et al. | 318/561 |
| 5,936,366 A | * | 8/1999 | Hamamura et al. | 318/560 |
| 5,952,804 A | * | 9/1999 | Hamamura et al. | 318/560 |
| 5,963,003 A | * | 10/1999 | Boyer | 318/574 |
| 5,973,466 A | * | 10/1999 | Nogami et al. | 318/569 |
| 6,404,160 B2 | * | 6/2002 | Sagasaki et al. | 318/600 |
| 6,501,997 B1 | * | 12/2002 | Kakino | 700/28 |
| 6,597,142 B2 | * | 7/2003 | Shibukawa et al. | 318/569 |

FOREIGN PATENT DOCUMENTS

| | | |
|---|---|---|
| JP | 62-293401 | 12/1987 |
| JP | 64-21605 | 1/1989 |
| JP | 6-222819 | 8/1994 |
| JP | 2000-3213 | 1/2000 |

OTHER PUBLICATIONS

Japanese Office Action in corresponding Japanese Application.

* cited by examiner

*Primary Examiner*—Kimberly Lockett
*Assistant Examiner*—Patrick Miller
(74) *Attorney, Agent, or Firm*—Staas & Halsey LLP

(57) ABSTRACT

Parameter set 1: T1$a$, T2$a$, Fa, Aa, parameter set 2: T1$b$, T2$b$, Fb, Ab, and parameter set 3: T1$c$, T2$c$, Fc, Ac, which consist of parameters having discrete values in three stages (large, medium and small) are prepared in the memory for example of the CNC 1 or the personal computer 3. For a given parameter set, the set giving priority to accuracy (S=0) is indicated by P (T1$p$, T2$p$, Fp, Ap), while the set giving priority to speed (S=1) is indicated by Q (T1$q$, T2$q$, Fq, Ag), and interpolation is performed and the parameter set Y=(1−S)×P+S×Q is obtained. The CNC 2 creates operating commands based on set Y and outputs these to the servo control section 2.

12 Claims, 4 Drawing Sheets

CONTROL DEVICE FOR DRIVING AND CONTROLLING A SERVOMOTOR

BACKGROUND OF THE INVENTION

1. Field of the Invention

The present invention relates to a control device for controlling a servomotor of a machine tool or industrial machine using a CNC (numerical control device), and more specifically, to a control device that improves the system of setting and adjusting various parameters that are necessary for servo system control.

2. Description of the Related Art

When using a CNC (numerical control device) to control machine tools, industrial machines and the like that are driven by a servomotor, it is necessary to set various parameters and when necessary to adjust what has been set. Generally, there are the following two types of parameters that require this sort of setting and adjusting.

(1) Parameters that regulate the content of servo system control:

(2) Parameters for deciding how commands are issued:

Examples of (1) include parameters that determine the gain of the position loop, speed loop, and current loop, and the filter constant to avoid mechanical resonance. Examples of (2) are parameters for deciding how commands such as acceleration and deceleration time constants and the method of corner deceleration are issued. More specifically, this includes the way to apply acceleration and deceleration time constants before and after interpolation, the corner deceleration, the deceleration due to the command acceleration, and the deceleration due to the change in acceleration.

Of the parameters that are broadly divided into (1) and (2) above, the parameters in (1) for performing servo system control have a general feature that enables to almost uniquely determine the optimal value for achieving best performance, once the mechanical system has been determined. However, in respect of the parameters in (2) for deciding how commands are issued, when looked at from this perspective, a state of affairs exists that makes it difficult to decide on the optimal values. For example in the case of mechanical tools, the parameter values that ought to be selected differ according to whether reducing the machining time is given priority, or whether increasing the machining accuracy is given priority. Moreover, since there are a number of parameters that influence machining time and machining accuracy, the problem arises as to how to combine the parameters to obtain the desired results.

Conventionally, in the case of parameters of type (2) such as the way to apply acceleration and deceleration time constants before and after interpolation, the corner deceleration, the deceleration due to a command acceleration, and the deceleration due to the change in acceleration, these parameters are not independently adjusted in response to the characteristics that are required for the machine or for machining. Instead a technique whereby parameter values are modified in a certain regular way has become widely known. However, in order to fulfill required specifications (requirements for example as to length of machining time and the degree of machining accuracy) to the greatest possible extent, it is necessary to modify a number of parameters simultaneously. For general users, this kind of adjustment is not easy, and it is necessary to have a high degree of skill in order to perform systematic adjustments to obtain results in accordance with the requirements.

In order to cope with this problem, a technique to simplify the setting and switching of parameters has been proposed, and is currently in use, whereby "parameter sets consisting of several kinds of parameters", each constituted in response to needs such as priority to accuracy, priority to speed, and priority to shock reduction, based on a number of sample settings, are prepared inside the CNC, so that a user switches parameters by choosing from these parameter sets the set the user considers optimal.

If this technique is used, it is only necessary to choose one parameter set from an index that gives priority to either accuracy, speed or shock, thereby making it easier for a general user to set the parameters according to their objective. However, even using this technique, since parameter sets are prepared using discrete values, it is impossible to take into account an operator's wish to give "a bit more priority to accuracy", "a bit more priority to speed" or "a bit more priority to shock reduction".

SUMMARY OF THE INVENTION

The object of the present invention is to improve the conventional control device of the type that prepares the above-mentioned parameter set, and enable the easy achievement of parameter adjustment so as to obtain results that are closer to the conditions desired by an operator.

In order to achieve this object, the present invention is able to create a new parameter set (intermediate parameter set) which includes an intermediate value of the discrete parameters, by an interpolation calculation using an interpolation coefficient, from the discretely prepared parameter sets.

The present invention consists of a servo control section that drives the servomotor and a numerical control section that provides operating commands to the servo control section. The present invention is applied to a control device for driving and controlling a servomotor based on several types of control parameters that regulate the operation of the servo control section and several types of control parameters that regulate the operation of the numerical control section.

The control device according to the present invention comprises a means for forming one or more groups with regard to one or more types of control parameters and storing a plurality of parameter sets each composed of individual parameter values in the groups; a means for selecting at least two sets from among the plurality of parameter sets; and a means for setting an index for providing any intermediate value with regard to corresponding parameter values in the two or more parameter sets selected. The present invention has the characteristic of driving and controlling a servomotor based on the intermediate value of each parameter in the parameter set, according to the index provided.

In this case, the storage means and the means for setting the index may be built into a computer that is connected to the control device. In a typical embodiment, the control parameter set for the numerical control section consists of a combination of at least one of acceleration and deceleration time constants, corner deceleration, permissible acceleration value, and permissible acceleration change amount. Further, the index for setting the intermediate value may be, for example, an index based on the machining time or the operation time of the machine, the machining accuracy of the machine, or the size of the shock accompanying acceleration and deceleration of the machine.

In addition, the formula for calculating the intermediate value of the two parameter sets can be expressed as intermediate value=$(1-S) \times \alpha + S \times \beta$ for example, where the parameter value of one parameter set is $\alpha$, the parameter value of the other parameter set is $\beta$, and the index is set to S ($0 \leq S \leq 1$).

BRIEF DESCRIPTION OF THE DRAWINGS

The above-mentioned as well as other objects and characteristics of the present invention will become clear from the following explanation of the embodiments with reference to the attached drawings, in which.

DETAILED DESCRIPTION OF THE PREFERRED EMBODIMENTS

Figure 1:
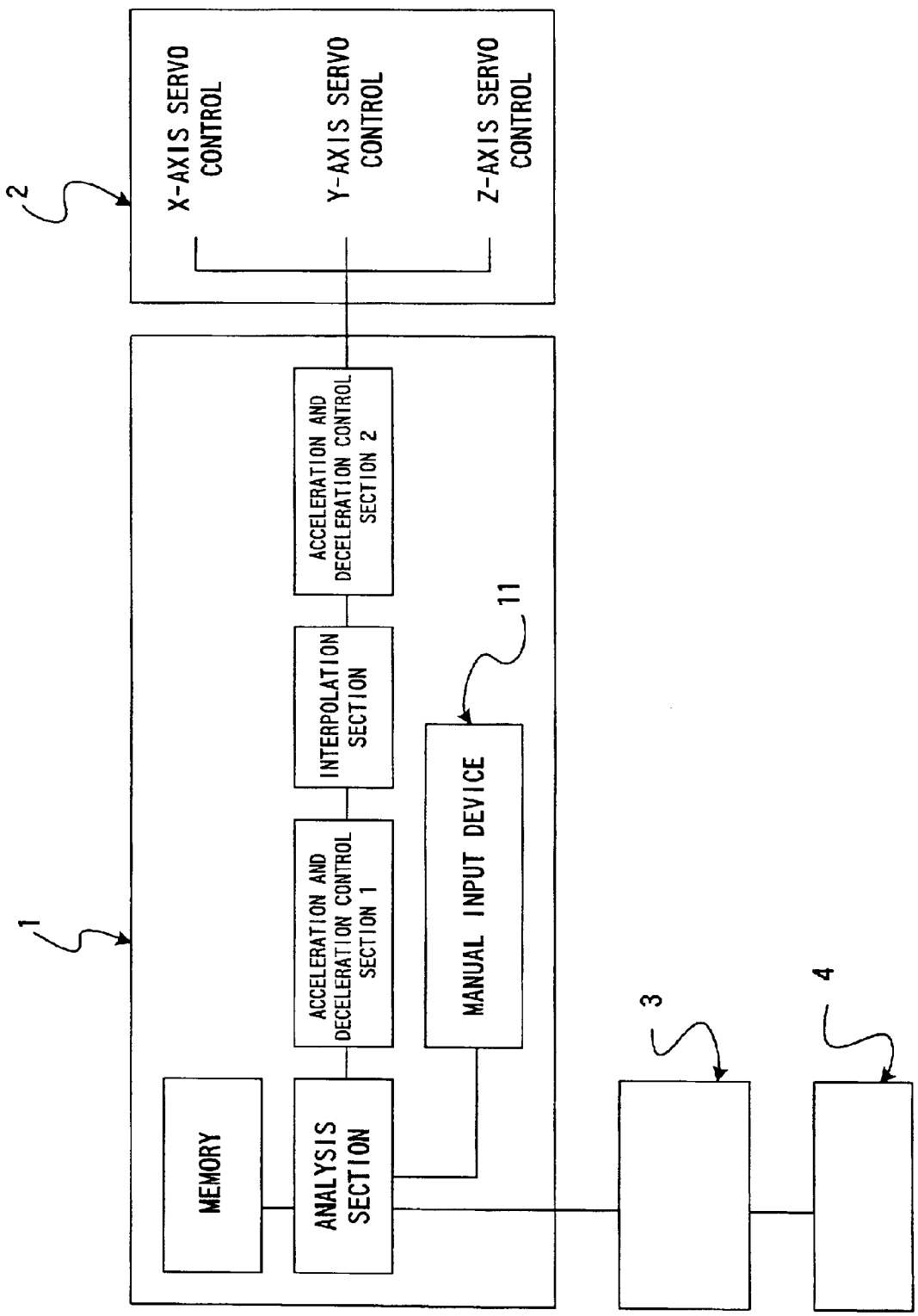
FIG. 1 is a block diagram showing the main elements constituting a control device according to one embodiment of the present invention.

FIG. 1 shows the main elements constituting a control device according to one embodiment of the present invention, in the form of a block diagram. The control device shown here is one example of a device that controls a machining tool of which three axes X, Y and Z are driven with servomotors, and the whole of the control device consists of a CNC (numerical control device) 1, a servo control section 2, a manual input device 11 on the CNC 1, a personal computer 3 connected to the CNC 1, and a manual input device (such as a keyboard and mouse) 4 connected to the computer 3.

The servo control section 2 drives and controls the servomotors of X, Y and Z axes, respectively, based on the operating commands given from the CNC 1. The CNC 1 is constituted from well-known hardware, and its function blocks include a memory, an analysis section, an acceleration and deceleration control section 1, an interpolation section and an acceleration and deceleration control section 2.

The analysis section analyses the command program read from the memory, and this analyzed command program is converted in the acceleration and deceleration control section 1 into data that is easy to process. After undergoing a filtering process before interpolation in the acceleration and deceleration control section 1, the output of the analysis section undergoes interpolation processing in the interpolation section. In other words, the points on the command path indicated by the data processed in the acceleration and deceleration control section 1 are interpolated in a prescribed sampling period, and outputted to the acceleration and deceleration control section 2. The acceleration and deceleration control section 2 performs a filtering process after interpolation, and this output is sent to the servo control section 2. Based on this, the servo control section 2 controls the servomotors of X, Y and Z axes, respectively, in the commonly known mode.

The conditions that specifically influence the contents of the operating commands given to the servo control section 2 when the CNC 1 undergoes these processes include:

(a) the time constants in acceleration and deceleration control after interpolation (filtering process); (b) the time constants in acceleration and deceleration control before interpolation (filtering process); (c) the permissible corner speed value in order to perform automatic corner deceleration; (d) the permissible acceleration value in order to perform automatic deceleration at a section where an acceleration is high; and (e) the permissible acceleration change amount in order to perform automatic deceleration at a section where the change in acceleration is great. The parameters used for the specification of these conditions are stored in advance in the memory of the CNC 1, or sometimes in the memory built into the personal computer 3, which is connected to the CNC 1.

Using the concept of a parameter set described above, based on a number of sample settings, several sets of parameters are prepared in the memory inside the CNC 1 (or sometimes in the memory of the personal computer 3), in the form of "parameter sets consisting of several kinds of parameters" each constituted in response to needs such as priority to accuracy, priority to speed, and priority to shock reduction.

In this embodiment, the above-mentioned (a) through (e) are employed here as the constituent elements of each parameter set. More specifically, (a) the time constants in acceleration and deceleration control after interpolation (filtering process), (b) the time constants in acceleration and deceleration control before interpolation (filtering process), (c) the permissible corner speed value in order to perform automatic corner deceleration, (d) the permissible acceleration value in order to perform automatic deceleration at a section where acceleration is high, and (e) the permissible acceleration change amount in order to perform automatic deceleration at a section where the change in acceleration is great, are employed as the constituent elements of each parameter set.

Each of these parameters, depending on its size, influences a desired condition (for example, shock size, degree of path accuracy, and machining speed) in respect of a mechanical operations. First, regarding (a) the filtering time constant after interpolation, if this time constant is set to be large, the shock will decrease but the path accuracy will worsen. On the other hand, if the time constant is set to be small, the shock will increase but the path accuracy will improve. Thus there is a trade-off relationship.

Similarly, regarding (b) the filtering time constant before interpolation, if this time constant is set to be large, the path accuracy will improve but the machining speed (movement speed) will become slower. On the other hand, if the time constant is set to be small, the path accuracy will worsen but the machining speed (movement speed) will become faster.

Further, regarding (c) the permissible corner speed value, if the permissible speed value is set to be large, the path accuracy will worsen but the machining speed (movement speed) will become faster. On the other hand, if the permissible speed value is set to be small, the path accuracy will improve.

Also, in the same way, regarding (d) the permissible acceleration value, if the permissible acceleration value is set to be large, the path accuracy will worsen but the machining speed (movement speed) will become faster. On the other hand, if the permissible acceleration value is set to be small, the path accuracy will improve.

In addition, regarding (e) the permissible acceleration change amount, if the permissible acceleration change amount is set to be large, the path accuracy will worsen but the machining speed (movement speed) will become faster. On the other hand if the permissible acceleration change amount is set to be small, the path accuracy will improve.

Therefore, when determining the set of parameters, with this trade-off relationship in mind, the following discrete values are prepared for each parameter in three stages, that is, discretely large, intermediate and small values, and one discrete value for each parameter is extracted so that one parameter set is formed. The discrete values for each parameter are indicated as follows. Note that, for denoting each parameter in (a) through (e) as a variable, symbols T1, T2, F, and A are used according to circumstances, where T1 denotes the time constant during acceleration and deceleration control after interpolation, T2 denotes the time constant during acceleration and deceleration control before interpolation, and F denotes the permissible corner speed. Further, A is used to denote both the permissible acceleration and the permissible speed change, and is shown to represent both of these.

Time constant after interpolation T1:
T1$a$ (small), T1$b$ (intermediate), T1$c$ (large);
Time constant before interpolation T2:
T2$a$ (large), T2$b$ (intermediate), T2$c$ (small);
Permissible corner speed F:
Fa (small), Fb (intermediate), Fc (large);
Permissible acceleration/permissible change amount A:
Aa (small), Ab (intermediate), Ac (large)

Then, the following parameter sets 1 through 3 (three sets in total) are set up for these discrete value groups.
Parameter set 1: T1$a$, T2$a$, Fa, Aa
Parameter set 2: T1$b$, T2$b$, Fb, Ab
Parameter set 3: T1$c$, T2$c$, Fc, Ac In the memory of the CNC 1 (or the memory of the personal computer 3), the data indicating the parameter sets 1 through 3 is stored in advance, together with the data for these individual discrete values of parameter T1 (T1$a$, T1$b$, T1$c$), the discrete values of T2 (T2$a$, T2$b$, T2$c$), the discrete values of F (Fa, Fb, Fc), and the discrete values of A (Aa, Ab, Ac). It is possible to alter this stored data for example by using the manual input device 4 that is connected to the personal computer 3.

Figure 2:
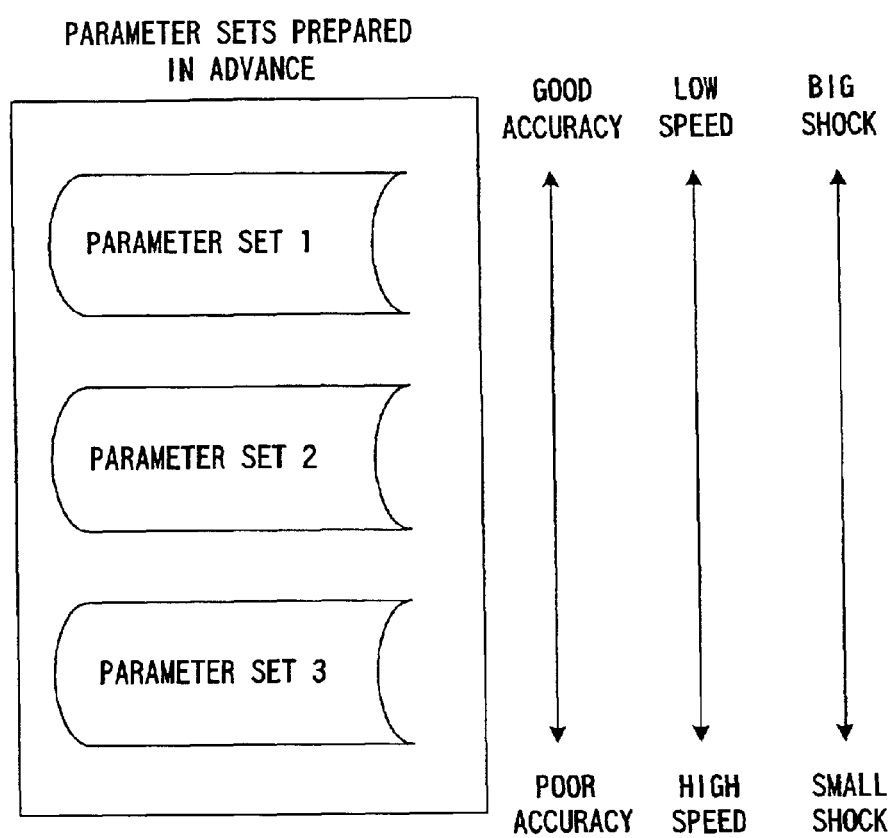
FIG. 2 is a view showing collectively the trade-off relationships accompanying each set selection in terms of the parameter sets 1 through 3 that are prepared in the same embodiment.

In the above-mentioned conventional technology, an operator, with the intended application in mind, selects a parameter set from the parameter sets 1 through 3 that have been prepared in this way. The CNC 1 then outputs an operating command to the servo control section 2 according to the parameter values specified by the selected parameter set. FIG. 2 shows collectively the characteristics of the parameter sets 1 through 3 (the trade-off relationships accompanying each set selection).

As explained previously, whichever parameter set is selected, the results in many cases will be unsatisfactory, due to these trade-off relationships, so that there arises demands for performing more detailed adjustments (for example, to give "a bit more priority to accuracy", "a bit more priority to speed" or "a bit more priority to shock reduction"). However, as mentioned above, it is difficult for a general user to alter parameter values to respond to these demands.

Therefore, according to the characteristics of the present invention, an intermediate value of a discretely prepared parameter set can be easily created and used by interpolating with a certain interpolation coefficient. An example of such creation of intermediate values is explained below.

The interpolation coefficient is indicated by S, and a memory space for setting the value of S as a variable parameter is set up in the CNC 1 or the personal computer 3. The values that S is able to obtain are $0 \leq S \leq 1$, and within this interval, the closer the value is to 0, the greater the priority given to accuracy, and the closer the value is to 1, the greater the priority given to speed.

Any two parameter sets are taken from the parameter sets 1, 2 and 3, and of these two parameter sets taken, the parameter set giving the highest priority to accuracy (S=0) is P (parameter contents are indicated by T1$p$, T2$p$, Fp, Ap), while the parameter set giving the highest priority to speed is Q (parameter contents are indicated by T1$q$, T2$q$, Fq, Aq), and the parameter set Y to be created by an interpolation is obtained using Y=(1−S)×P+S×Q.

For each constituent elements in the parameter set created by an interpolation,

T1$y$=(1−S)×T1$p$+S×T1$q$

T2$y$=(1−S)×T2$p$+S×T2$q$

Fy=(1−S)×Fp+S×Fq

Ay=(1−S)×Ap+S×Aq

By simply adjusting the value of the interpolation coefficient S, the user can obtain any intermediate value between a parameter set giving priority to accuracy discretely provided and a parameter set giving priority to speed discretely provided. Consequently, in response to a user's detailed demand for parameter alteration, such as wanting "a bit more accuracy" or "a bit more speed", a means enabling parameter modification without imposing a burden on a user can be provided.

If the parameter sets 1 through 3 as shown in FIG. 2 are set up as in the present embodiment, if a user wants to give slightly more priority to speed than is currently the case, S should be increased by an appropriate amount, while, if a user wants to give slightly more priority to accuracy, S should be decreased by an appropriate amount.

Such adjustment is carried out from a viewpoint of speed (in other words, machining time or operating time) or machining accuracy, or from a viewpoint of the size of the shock that accompanies acceleration and deceleration of the machine.

In short, in the present embodiment, the relationship between each of those viewpoints and the size of S is expressed as follows.

| S = 0 →→→→ | .. (increase) .. | →→→→ S = 1 |
|---|---|---|
| Good accuracy →→→→ | . . . . . . . . . . . | →→→→ Poor accuracy |
| Low speed →→→→ | . . . . . . . . . . . | →→→→ High speed |
| Big shock →→→→ | . . . . . . . . . . . | →→→→ Small shock |

Note that, in the present embodiment, the interpolation coefficient S is specified by a user using the manual input device 11 of the CNC 1, however it may also be specified using the manual input device 4 connected to the personal computer 3. Further, the number of parameter sets to be prepared need not be three, generally two or more parameter sets may be prepared. However, it is not much necessity to prepare a large number of parameter sets, since detailed adjustment can be achieved by adjusting the interpolation coefficient S based on the characteristics of the present invention.

Figure 4:
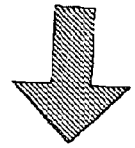
FIG. 4 is a view showing an example employing a human interface (selection screen) for specifying the intermediate value using a slider-type software component.

Note that, as a method for specifying the interpolation coefficient S, a volume that can be moved continuously, or a software component, may be set up in the manual input device 11 of the CNC 1 or the manual input device 4 of the personal computer 3, with the result that the interpolation coefficient S is specified with the index indicated by such a volume or software component. FIG. 4 shows an example employing a human interface (selected screen) that specifies an intermediate value according to a slider-type software component. A parameter set giving priority to speed and a parameter set giving priority to accuracy are prepared, and the values of these parameter sets are used as values at the both ends, so that the intermediate value can be determined based on the position of a slider (refer to the arrow), that the operator specifies using a mouse, for example.

Furthermore, the specification and alteration of the interpolation coefficient S can be carried out not only from the manual input device 11 of the CNC 1 or the manual input device 4 of the personal computer 3, but also from the machining program.

Figure 3:
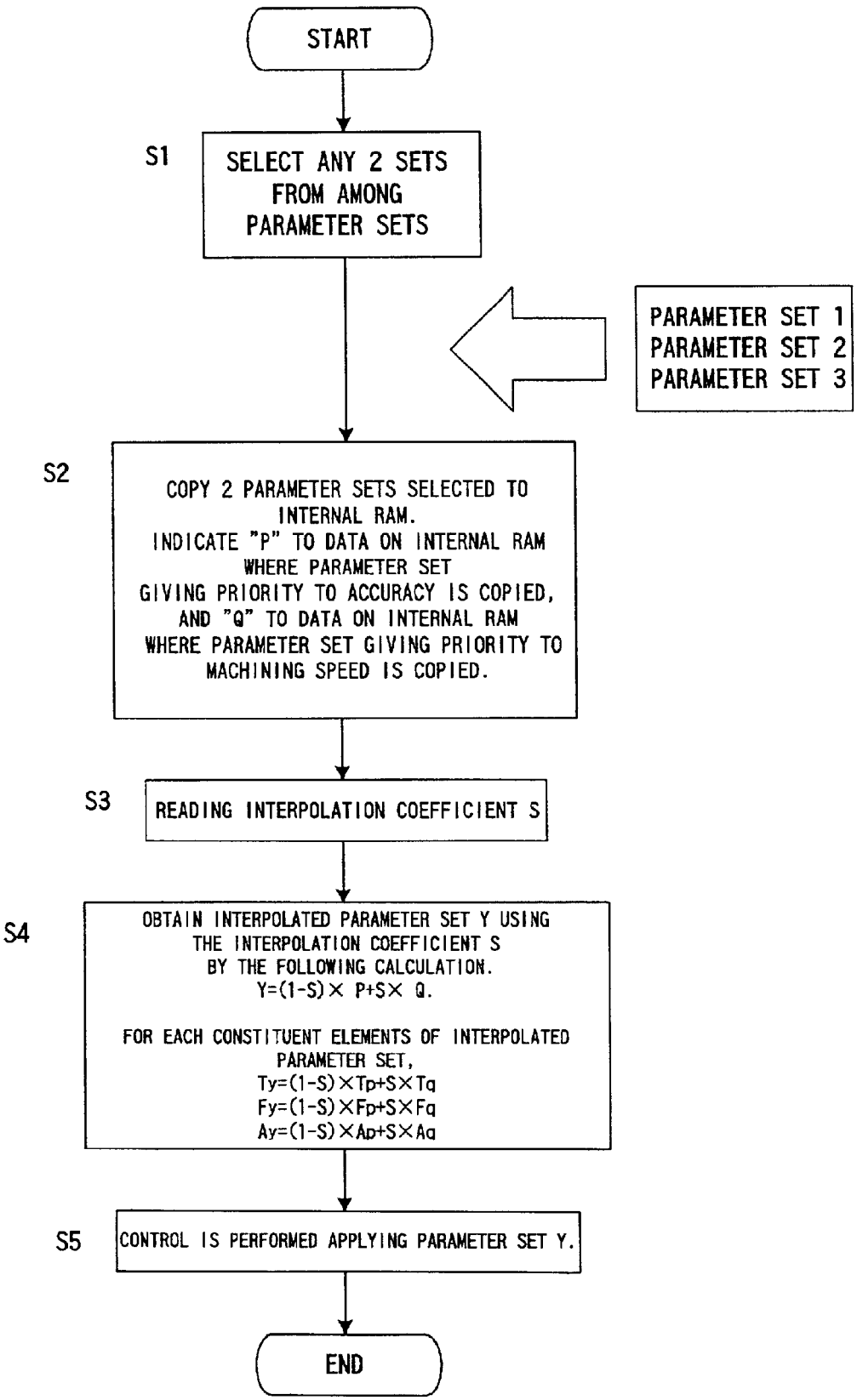
FIG. 3 is a flow chart setting out an outline of the process relating to parameter set adjustment using an interpolation coefficient S.

Finally, the flow chart in FIG. 3 shows an outline of the process for adjustment of the parameter set using the interpolation coefficient S. The main points of each step are as follows.

Step S1: Any two parameter sets are selected from the group of parameter sets. Note that the two parameter sets can be selected by the operator using the manual input device 11 of the CNC 1.

Step S2: The selected parameter sets are copied to the internal RAM inside the memory of the CNC 1. The internal RAM data where the parameter set giving more priority to accuracy is copied is indicated by P, and the data on the internal RAM where the parameter set giving more priority to machining speed is copied is indicated by Q.

Step S3: The data of the interpolation coefficient S that the operator has specified using the manual input device is read from the memory in the CNC 1.

Step S4: Using the interpolation coefficient S that has been read, interpolation is carried out and the parameter set Y is calculated and obtained using $Y=(1-S)\times P+S\times Q$. The calculation of each constituent element is as follows.

$Ty=(1-S)\times T1p+S\times T1q$ $Fy=(1-S)\times Fp+S\times Fq$ $Ay=(1-S)\times Ap+S\times Aq$ Note that, here, Ty indicates both or either of T1y and T2y. But, in case where both T1y and T2y are included in the parameter set, as explained previously, they become $T1y=(1-S)\times T1p+S\times T1q$ $T2y=(1-S)\times T2p+S\times T2q$ Step S5: The parameter set Y that has been obtained is applied to create operating commands, and control is performed.

According to the present invention, the conventional control device of a type that prepares parameter sets to determine control contents of a servo system is improved by making it easy for parameters to be set and adjusted in order to bring about results closer to the conditions desired by the operator. For example, demand for giving "a bit more priority to path accuracy", "a bit more priority to operating speed" or "a bit more priority to shock reduction" can be satisfied.

What is claimed is:

1. A control device having a servo control section driving a servomotor and a numerical control section providing operating commands to said servo control section, and which drives and controls the servomotor based on several types of control parameters that regulate the operation of said servo control section and several types of control parameters that regulate the operation of said numerical control section, wherein said control device comprises:

means for forming one or more groups with regard to one or more types of said control parameters and storing a plurality of parameter sets each composed of individual parameter values in said groups;

means for selecting two or more sets from among said parameter sets; and means for setting an index providing any intermediate values with regard to corresponding parameter values in the two or more parameter sets selected; wherein said servomotor is driven and controlled based on the intermediate values, according to said index provided.

2. The control device according to claim 1, wherein a computer is connected to said control device, and a storage means and said means for setting the index are provided in said computer.

3. The control device according to claim 1, wherein said control parameter set for said numerical control section consists of a combination of at least any one of acceleration and deceleration time constants, corner deceleration, permissible acceleration value, and permissible acceleration change amount.

4. The control device according to claim 1, wherein said index for setting the intermediate value is based on a machining time or an operation time of a machine.

5. The control device according to claim 1, wherein the index for setting said intermediate value is based on the manufacturing accuracy of a machine.

6. The control device according to claim 1, wherein the index for setting said intermediate value is an index based on the size of the shock accompanying acceleration and deceleration of a machine.

7. The control device according to claim 1, wherein the intermediate values of said two or more parameter sets are obtained by intermediate value=$(1-S)\times\alpha+S\times\beta$, where the parameter value of one parameter set is $\alpha$, the parameter value of the other parameter set is $\beta$, and said index is S, where S is greater than or equal to zero and less than or equal to one.

8. The control device according to claim 1, wherein said means for selling an index providing any intermediate values outputs commands based on a machining program.

9. The control device according to claim 1, wherein as the means for setting an index providing any intermediate values, a volume or a software component that can be moved continuously is prepared in said control device or in a computer connected to said control device, and commands are outputted based on the index indicated by this volume or software component.

10. A control device having a servo control section driving a servomotor and a numerical control section providing operating commands to said servo control section, wherein two or more sets of control parameters that regulate the servo control section and the numerical control section are stored in a memory, the control device comprising:

a unit selecting two or more sets from among the control parameter sets; and a unit setting an index providing intermediate values with regard to corresponding parameter values in the two or more parameter sets selected;

wherein the servomotor is driven and controlled based on the intermediate values, according to the index provided.

11. A method of controlling a servomotor, the method comprising:

storing a plurality of parameter sets each composed of individual parameter values;

selecting two or more sets from among the parameter sets;

setting an index to provide intermediate values with regard to corresponding parameter values in the two or more selected sets; and controlling the servomotor based on the intermediate values according to the index provided.

12. The method of claim 11, wherein the intermediate values are obtained by intermediate value=$(1-S)\times\alpha+S\times\beta$, where the parameter value of one parameter set is $\alpha$, the parameter value of the other parameter set is $\beta$, and the index is S, where S is greater than or equal to zero and less than or equal to one.

* * * * *

UNITED STATES PATENT AND TRADEMARK OFFICE
CERTIFICATE OF CORRECTION

PATENT NO. : 6,806,674 B2
DATED : October 19, 2004
INVENTOR(S) : Yasusuke Iwashita et al.

It is certified that error appears in the above-identified patent and that said Letters Patent is hereby corrected as shown below:

Column 8,
Line 37, please change "selling" to -- setting --.

Signed and Sealed this

Twenty-sixth Day of April, 2005

JON W. DUDAS
*Director of the United States Patent and Trademark Office*